(12) United States Patent
Hiraoglu et al.

(10) Patent No.: US 6,185,272 B1
(45) Date of Patent: Feb. 6, 2001

(54) ARCHITECTURE FOR CT SCANNING SYSTEM

(75) Inventors: Muzaffer Hiraoglu, Woburn; Sergey Simanovsky, Lynn; Ibrahim M. Bechwati, Roslindale; Carl R. Crawford, Brookline, all of MA (US)

(73) Assignee: Analogic Corporation, Peabody, MA (US)

( * ) Notice: Under 35 U.S.C. 154(b), the term of this patent shall be extended for 0 days.

(21) Appl. No.: 09/268,628

(22) Filed: Mar. 15, 1999

(51) Int. Cl.$^7$ .................................................. G01N 23/04
(52) U.S. Cl. ................... 378/57; 378/8; 378/901
(58) Field of Search ................ 378/4, 8, 15, 62, 378/57, 901

(56) References Cited

U.S. PATENT DOCUMENTS

| | | |
|---|---|---|
| 5,319,547 | 6/1994 | Krug et al. .............................. 705/13 |
| 5,367,552 | 11/1994 | Peschmann ............................. 378/57 |
| 5,473,657 | 12/1995 | McKenna ................................ 378/4 |
| 5,630,101 | 5/1997 | Sieffert ..................................... 710/11 |
| 5,661,774 | 8/1997 | Gordon et al. ......................... 378/101 |
| 5,802,134 | 9/1998 | Larson et al. ............................ 378/4 |
| 5,838,758 | 11/1998 | Krug et al. ............................. 378/53 |
| 5,901,196 | * 5/1999 | Sauer et al. ............................. 378/4 |
| 5,970,111 | * 10/1999 | Samarasekera et al. ................. 378/4 |

* cited by examiner

Primary Examiner—David V. Bruce
(74) Attorney, Agent, or Firm—McDermott, Will & Emery

(57) ABSTRACT

A system for and method of detecting and classifying objects contained within or concealed by items scanned by an X-ray scanner is described. Greater throughput and relatively reduced cost is achieved by using a shared bulk memory for entering imaging data received from the scanner into slots of a bulk shared memory; and storing detection and classification data in slots of the bulk memory after processing imaging data so as to provide detection and classification data relating to absence or suspected presence of predetermined target objects. Preferably, the scanner is a CT scanner and the imaging data is CT data.

39 Claims, 7 Drawing Sheets

ARCHITECTURE FOR CT SCANNING SYSTEM

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

Various X-ray baggage scanning systems are known for detecting the presence of contraband in baggage or luggage, prior to loading the baggage onto a commercial aircraft. In recent years there has developed considerable interest in detecting explosive materials that may be hidden in baggage. Since many explosive materials may be characterized by a range of densities differentiable from that of other objects typically found in baggage, explosives are generally amenable to detection by X-ray equipment. A common technique of measuring a material's density is to expose the material to X-rays and to measure the amount of radiation absorbed by the material, the absorption being indicative of the density.

With the tremendous growth of the travel industry, there has been a recent trend to automatically detect the presence of such explosive materials with X-rays. Different X-ray systems have been proposed. For example, U.S. Pat. No. 5,319,547 and U.S. Pat. No. 5,838,758, both issued in the names of Krug et al. and assigned to Vivid Technologies of Waltham MA (hereinafter the '547 and '758 Patents), describe an X-ray line scanner for automatically scanning luggage (hereinafter the "Vivid Machine"), while U.S. Pat. No. 5,367,552, issued to Peschmann and assigned to InVision Technologies of Foster City, Calif., describes a CT scanner for automatically scanning luggage (hereinafter the "InVision Machine").

Current Federal Aviation Agency (FAA) regulations define the requirements for certifying automated explosive detection systems and imply high sensitivity (high probability of detection) and high specificity (low probability of false alarms). Throughput is also currently defined by these regulations. The certifiable level of throughput with high sensitivity and high specificity is difficult to achieve in systems which must complete the processing of a bag while it is in the scanner, and stop the conveyor if necessary to accomplish that end.

While both the Vivid and Invision Machines are designed to automatically detect explosives, to date the Vivid Machine has not been certified by the FAA. The throughput of the Invision Machine is insufficient because it does not continuously scan bags. The belt is stopped for each bag, and a variable number of slices are acquired for each bag depending upon the contents of the bag. Therefore, it is impossible to reliably predict throughput of the machine.

It is an object of the present invention to overcome the infirmities of these prior art systems.

A more specific object of the present invention is to provide an automatic X-ray detection system.

Another object of the present invention is to provide an improved automatic X-ray detection baggage scanning system capable of acquiring sufficient data at a desired data rate while an item passes through the system so as to eliminate the need to take a variable number of slices so that the conveyor can continuously transfer bags through the system without stopping the conveyor.

Another object of the present invention is to provide an automatic X-ray detection system capable of reliably providing a certifiable level of throughput with high sensitivity and high specificity.

And another object of the present invention to increase the throughput, while reducing the overall costs of an automatic X-ray detection system.

It is yet another object of the present invention to provide an improved system architecture for use in such systems.

It is still another object of the present invention to provide an improved software architecture for an automated X-ray baggage scanning system.

It is still another object of the present invention to provide improved data processing techniques to meet certification requirements and yet use known multi-processor systems for processing the data.

SUMMARY OF THE INVENTION

In accordance with one aspect of the present invention, a system for automatically detecting predetermined image information contained with data representative of a scanned image of an object is described. The system comprises a system architecture including:

one or more data processes to fill shared memory with the data;

one or more detection processes to detect the presence of the predetermined image information from the data in shared memory;

one or more display processes to display information related to (a) the data and (b) the presence of the predetermined image information from the data in shared memory; and a controller process constructed and arranged so as to support the data, detection and display processes substantially independently of one another all on the same computer system having predetermined resources so that the resources are used in an optimal timely fashion.

In one embodiment the system further includes conveying items so as to sequentially scan a plurality of objects. In another embodiment the detection processes provide detection and classification data relating to the presence or absence of the predetermined image information. In another embodiment the detection processes coordinate themselves, while in another embodiment the detection processes are controlled by a controller. In yet another embodiment access to the shared bulk memory is controlled by the controller, while in another embodiment access to the shared bulk memory is controlled by an access flag. In still another embodiment the imaging data can be stored in an archive subsystem, which can contain either non-volatile or volatile memory, or both. In another embodiment, the data is acquired from a scanner, which preferably is a CT scanner. The system can display information related to at least one CT slice, as well as associated detection data. The CT data can be displayed in the order that the detection processes are completed with respect to each scanned item, or in the order each item enters the scanner. In addition suspected objects can be marked in the displayed images, for example as synthetic projections of the items containing the objects. In another embodiment, additional information associated suspected objects detected can also be displayed. For example, suspected objects in said display information can be marked and information related to a suspected object can be linked to the marks. The information displayed can automatically change as the items move through the scanner, and the display of information related to at least one of said CT slices and associated detection data can be suspended in order to examine the display. False detection of a suspected object can be cleared by the operator. Additional information can be displayed including data representing items that are awaiting to be displayed, and/or the number of items that have been scanned; and/or identification numbers associated with such items; and/or the number of such items; and/or information regarding any items that are awaiting detection includes displaying item identification numbers associated with such items.

In accordance with another aspect of the invention, an apparatus is capable of detecting and classifying objects contained within or concealed by items scanned by the apparatus. The detection apparatus comprises:

- at least one CT x-ray scanner constructed and arranged so as to generate CT data representative of a plurality of CT slices of a scanned item;
- a communication subsystem in communication with the CT x-ray scanner;
- a detection and classification subsystem constructed and arranged so as to process CT data and provide detection and classification data related to the absence or the suspected presence of detected objects associated with one or more CT slices of a scanned item;
- a bulk shared memory comprising a plurality of memory slots constructed to store CT data and detection and classification data related to the detection and classification of suspected objects derived from the CT data; and
- a control subsystem cooperative with (1) the communication system so as to enter CT data received from the scanner into slots of the bulk shared memory; (2) the detection and classification subsystem so as process CT data so as to provide detection and classification data, and store the detection and classification data in slots of the bulk shared memory.

In one embodiment the scanning apparatus further includes a conveying system for conveying items through the scanner. In another embodiment the detection and classification subsystem includes multiple processors each cooperative with the bulk shared memory; and/or is constructed and arranged so as to process CT data and provide detection and classification data related to the absence or the suspected presence of objects associated with one or more CT slices of a scanned item in accordance with each of a plurality of different sets of detection criteria and a plurality of independent processes, which in one embodiment are coordinated themselves, or alternatively with a controller. In another embodiment the controller controls access to the shared bulk memory. In another alternative embodiment the control subsystem includes an access flag for controlling access to the shared bulk memory. In still another embodiment an archive subsystem can be constructed and arranged so as to store CT data. The archive system can include volatile or non-volatile memory or both. In one embodiment the display constructed and arranged so as to display information related to at least one of said CT slices and associated detection data.

In accordance with another aspect of the invention, a method of detecting predetermined objects contained within or concealed by items scanned by an X-ray scanner is provided. The method comprises:

- entering imaging data received from the scanner into slots of a bulk shared memory;
- processing imaging data so as to provide detection and classification data relating to absence or suspected presence of predetermined objects; and
- storing the detection and classification data in slots of the bulk shared memory.

In one embodiment the method of processing imaging data includes sharing bulk memory among a plurality of processors.

In accordance with yet another aspect of the invention, the presence of predetermined objects contained within or concealed by items scanned by an X-ray scanner is also described. The method comprises:

- receive a set of data representative of a corresponding scanned object and store the set of data in a predefined slot in memory in a predetermined data queue;
- process data in each slot in a predetermined detection queue in accordance with one or more detection processes;
- storing the results of each detection process in the same slot in which the corresponding set of data is stored; and
- displaying the results of the detection process.

BRIEF DESCRIPTION OF THE DRAWINGS

The foregoing and other objects of this invention, the various features thereof, as well as the invention itself, may be more fully understood from the following description, when read together with the accompanying figures, as described below.

DETAILED DESCRIPTION OF THE PREFERRED EMBODIMENT

Figure 1:
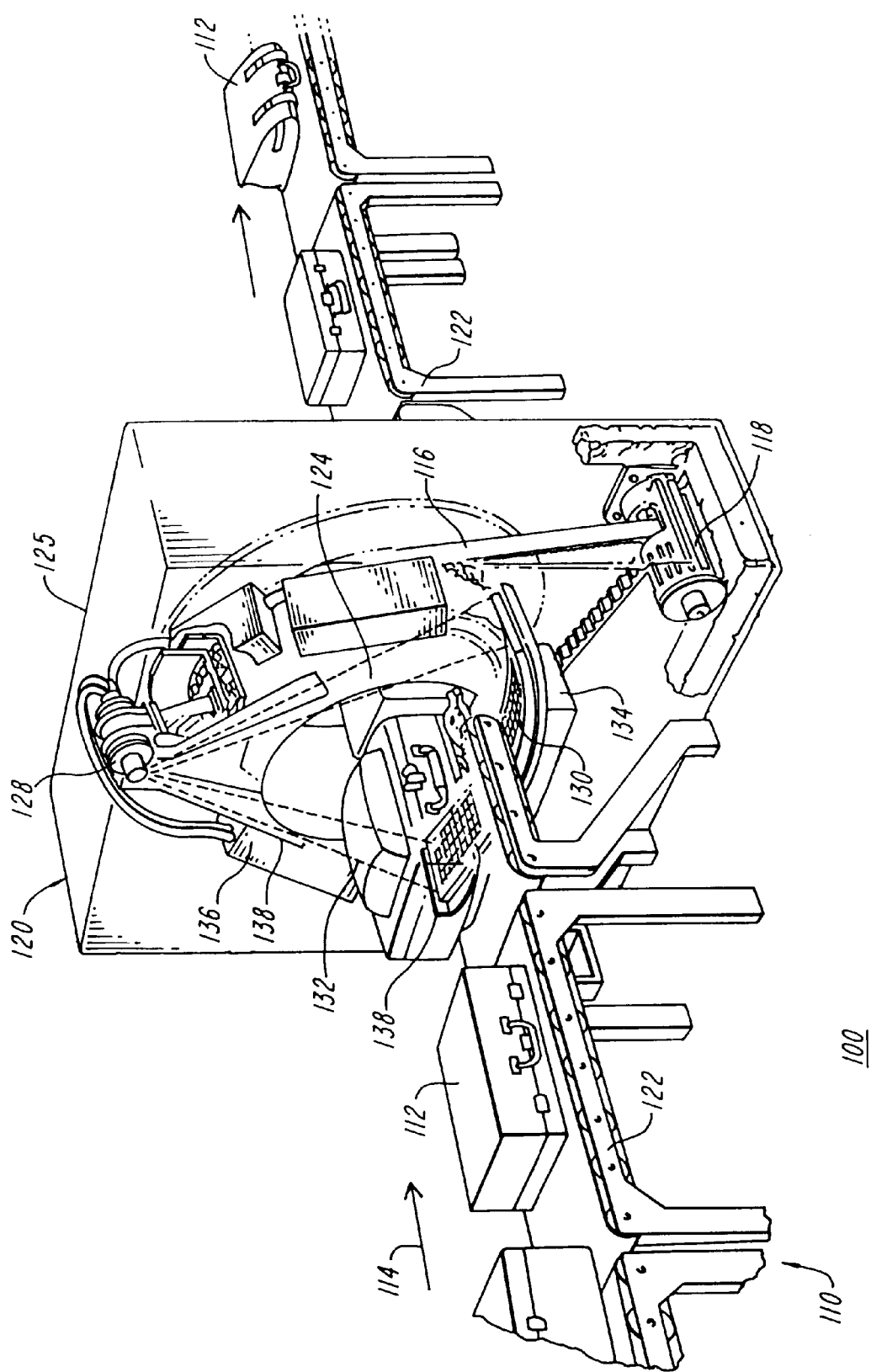
FIGS. 1, 2 and 3 are perspective views of an embodiment of an end and side CT baggage system or the incorporating the present invention

In order to meet the certification requirements of the FAA, the explosive detection X-ray system of the present invention must have a high throughput, automated detection and a baggage viewing station (BVS) for operator-assisted threat resolution. As mentioned, automatic detection certification implies high sensitivity and high specificity. In accordance with the present invention, a continuously running conveyor system is provided that assures that the regulated criteria are satisfied.

The FAA certification implies complicated algorithms for object identification and false alarm reduction. The algorithms are complicated in the sense that are of a high computational complexity. See, for example, the following pending applications, all of which are all assigned to the present assignee and are herein incorporated by reference:

U.S. patent application Ser. No. 09/022,189, "Apparatus and Method for Detecting Sheet Objects in Computed Tomography Data," invented by Muzaffer Hiraoglu, et al. and filed on Feb. 11, 1998;

U.S. patent application Ser. No. 09/022,164, "Multiple-Stage Apparatus and Method for Detecting Objects in Computed Tomography Data," invented by Muzaffer Hiraoglu, et al. and filed on Feb. 11, 1998;

U.S. patent application Ser. No. 09/022,062, "Apparatus and Method for Optimizing Detection of Objects in Computed Tomography Data," invented by Muzaffer Hiraoglu, et al. and filed on Feb. 11, 1998;

U.S. patent application Ser. No. 09/022,064, "Apparatus and Method for Detection of Liquids in Computed Tomography Data," invented by Muzaffer Hiraoglu, et al. and filed on Feb. 11, 1998;

U.S. patent application Ser. No. 09/021,889, "Apparatus and Method for Density Discrimination of Objects in Computed Tomography Data Using Multiple Density Ranges," invented by Sergey Simanovsky, et al. and filed on Feb. 11, 1998, U.S. patent application Ser. No. 09/021,781, "Apparatus and Method for Eroding Objects in Computed Tomography Data," invented by Sergey Simanovsky, et al. and filed on Feb. 11, 1998;

U.S. patent application Ser. No. 09/022,165, "Apparatus and Method for Detecting Sheet Objects in Computed Tomography Data," invented by Sergey Simanovsky, et al. and filed on Feb. 11, 1998;

U.S. patent application Ser. No. 09/022,354, "Apparatus and Method for Correcting Object Density in Computed Tomography Data," invented by Ibrahim M. Bechwati, et al. and filed on Feb. 11, 1998;

U.S. patent application Ser. No. 09/022,060, "Apparatus and Method for Combining Related Objects in Computed Tomography Data," invented by Ibrahim M. Bechwati, et al. and filed on Feb. 11, 1998;

U.S. patent application Ser. No. 09/021,782, "Apparatus and Method for Classifying Objects in Computed Tomography Data Using Density Dependent Mass Thresholds," invented by Ibrahim M. Bechwati, et al. and filed on Feb. 11, 1998;

U.S. patent application Ser. No. 09/022,059, "Computed Tomography Apparatus and Method for Classifying Objects," invented by Sergey Simanovsky, et al. and filed on Feb. 11, 1998; and U.S. patent application Ser. No. 09/022,204, "Apparatus and Method for Detecting Objects in Computed Tomography Data Using Erosion and Dilation of Objects," invented by Sergey Simanovsky, et al. and filed on Feb. 11, 1998.

U.S. patent application Ser. No. 09/228,379, "Apparatus And Method For Processing Objects In Computed Tomography Data Using Object Projections," invented by Carl Crawford, Ibrahim Bechwati, Sergey Simanovsky and Muzaffer Hiraoglu and filed Jan. 12, 1999.

U.S. patent application Ser. No. 09/228,380, "Apparatus And Method For Detecting Concealed Objects In Computed Tomography Data," invented by Sergey Simanovsky, Ibrahim Bechwati, Muzaffer Hiraoglu and Carl Crawford and filed on Jan. 12, 1999.

Since explosives can take different forms, sheet and bulk being the most typical, as described in these pending U.S. patent applications, detection methods preferably differ for respectively different forms in order to optimize detection while minimizing false alarms in accordance with the certification criteria. Accordingly, separate detection algorithms for sheet and bulk explosives are described. Further, the requirement for high throughput implies a high rate at which a large number of bags have to be scanned. This, coupled with complicated and differing algorithms for respectively different forms of explosives, necessarily results in a requirement for a fast rate for performing a large number of computer operations at a very fast rate in order to keep up with the rate at which data is acquired. In addition, utilizing a separate computer for running the detection algorithms and a separate computer for displaying information on the BVS, connected together through a distributive network (as is suggested in the InVision Machine), significantly adds to the cost of the system.

Custom designed computer systems of the prior art are costly and may degrade performance because of the necessity to transfer data between or among computer systems. Accordingly, in accordance with one aspect of the invention, it is desirable to use a commercially available computer system adapted and used in an automatic baggage detection system because of the cost advantages. However, because of the complicated computational processes required by the system and the high rate of processing required by the regulations, adapting such a commercially available system presents numerous problems. First, the following problems and observations were revealed after analyzing a number of computations required in a normal and typical stream of bags:

(a) the size of the bags vary implying a differing amount of computations for each bag;

(b) the amount of computations depends on the contents of a bag;

(c) the time required for running the routines related to the sheet and bulk paths of the program is often times uncorrelated; and (d) the computations performed by the BVS duplicate many of the computations made by the detection algorithms.

Thus, the time required to process a bag is variable and accordingly, completing the computations for each bag in the order in which the bags are scanned is not necessarily optimal.

Therefore, in accordance with one aspect of the present invention, a commercially available multi-processor computing system is provided, the computing system including a bulk memory which is shared by the processes carried out by detection algorithms and display on the BVS, thereby eliminating the need for multiple computers and a distributed network, as well as custom computers for performing the necessary computations.

In accordance with another aspect of the present invention, the baggage scanner is adapted to be utilized with a conveyor system that continuously operates to feed bags through the scanner at a rate sufficient to support the required high throughput. This is accomplished by tracking data at the output of the scanner.

As a result of the foregoing, in accordance with another aspect of the present invention, an improved software architecture was developed in which:

(a) sets of data respectively representing the bags are queued in the shared memory;

(b) as processors are freed up, they are each assigned a bag to begin processing, during which time it is not necessary to move the necessary bag data from the shared memory to the detection processor;

(c) sheet and bulk paths of the program can be run concurrently in separate processors to optimize the time required to process data;

(d) if a threat is determined to exist, the information is augmented to the information already in the shared memory and the BVS is notified of a bag for threat resolution.

Items (b) and (c) help balance out the loading of the multi-processors, while item (d) takes advantage of the fact that much of the information used by the BVS and the detection algorithms is shared, and therefore need not be duplicated.

Figure 2:
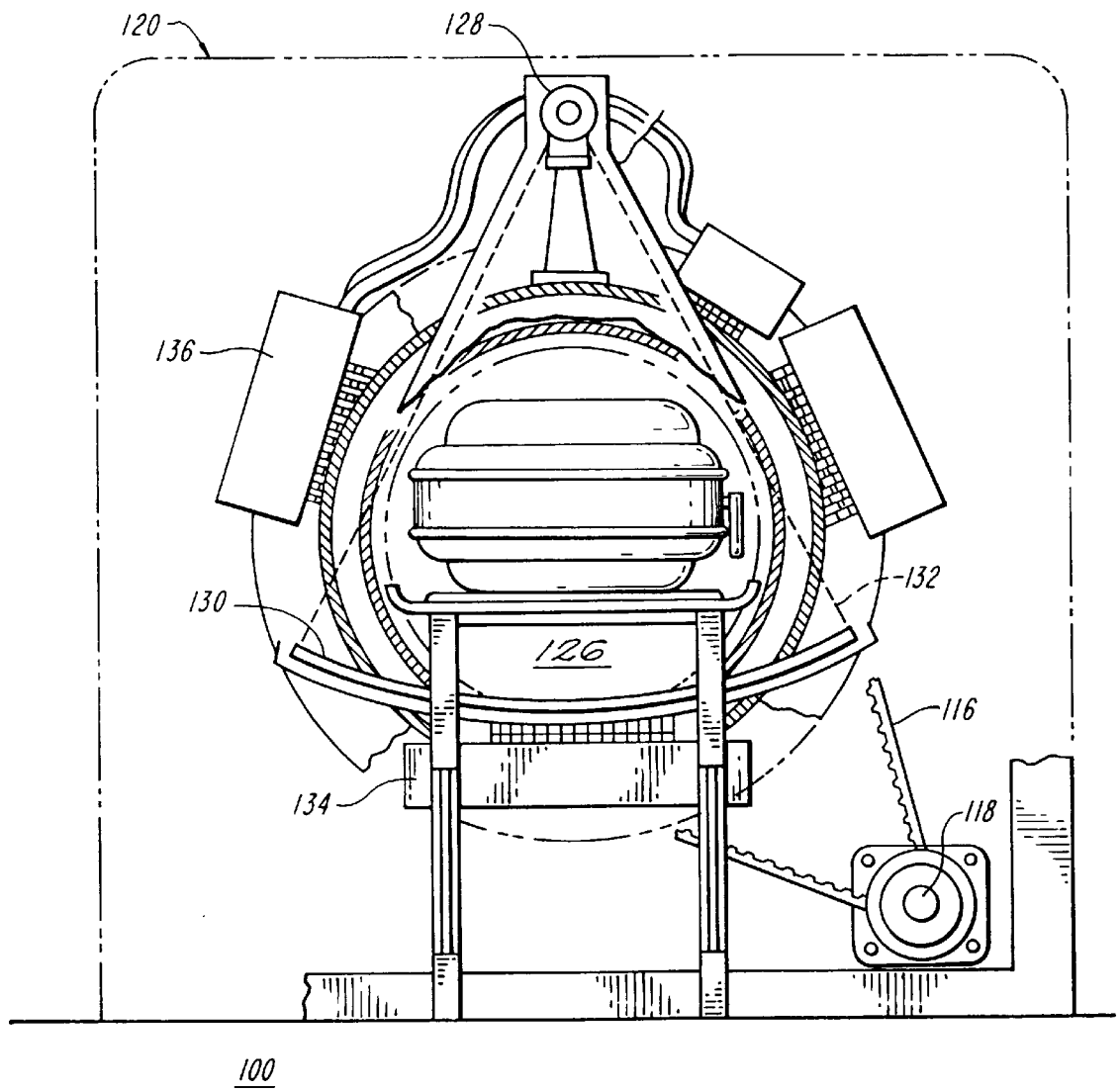
Figure 3:
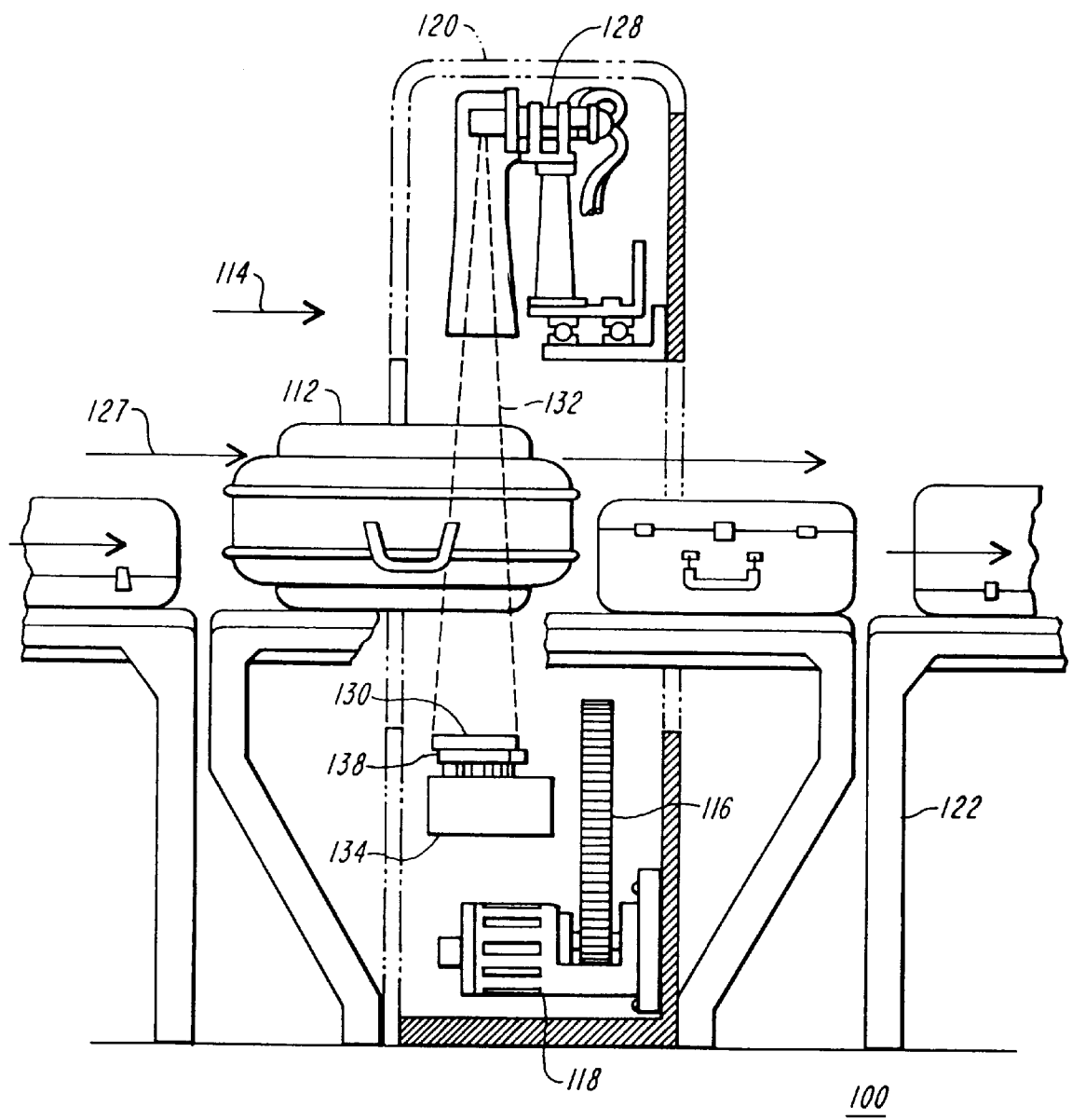

Referring to the drawings, FIGS. 1, 2 and 3 contain perspective, end cross-sectional and radial cross-sectional views, respectively, of a baggage scanning system 100 constructed in accordance with the invention, which provides object detection, identification, classification and/or discrimination. The baggage scanning system 100 generates CT data for a region which can include a piece of baggage. The system can use the CT data to generate image volume elements or "voxels" for the region. The baggage scanning system can be of the type described in the U.S. patent applications listed above and incorporated herein by reference.

The system 100 includes a conveyor system 110 for continuously conveying baggage or luggage 112 in a direction indicated by arrow 114 through a central aperture of a CT scanning system 120. The conveyor system includes motor driven belts for supporting the baggage. Conveyor system 110 is illustrated as including a plurality of individual conveyor sections 122; however, other forms of conveyor systems may be used.

The CT scanning system 120 includes an annular shaped rotating platform or disk 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the assignee of the present application and which is incorporated herein in its entirety by reference. Rotating platform 124 defines a central aperture 126 (see FIG. 2) through which conveyor system 110 transports the baggage 112.

The scanning system 120 includes an X-ray tube 128 and a detector array 130 which are disposed on diametrically opposite sides of the platform 124. The detector array 130 can be a two-dimensional array such as the array described in a copending U.S. patent application Ser. No. 08/948,450 entitled, "Area Detector Array for Computed Tomography Scanning System," filed on Oct. 10, 1997, in the names of David A. Schafer, Simon George Harootian and Sorin Marcovici, and U.S. patent application Ser. No. 08/991,852 entitled, "Integrated Radiation Detection And Collimation Assembly For X-ray Tomography System" filed on Dec. 16, 1997, in the names of Sorin Marcovici, Simon George Harootian and Ben Tuval, both applications being assigned to the present assignee both are incorporated herein by reference.

The system 120 further includes a data acquisition system (DAS) 134 for receiving and processing CT data signals generated by detector array 130, and an X-ray tube control system 136 for supplying power to, and otherwise controlling the operation of, X-ray tube 128. The system 120 is also preferably provided with a computer processing system for processing the output of the data acquisition system 134 and for generating the necessary signals for operating and controlling the scanning system 120. The X-ray tube control system 136 can be a multi-energy X-ray tube control system such as the dual-energy X-ray tube control system described in U.S. Pat. No. 5,661,774, issued in the names of Bernard M. Gordon, Hans Weedon, Iosif Izrailit, Timothy R. Fox and and John F. Moore on Aug. 26,1997,and entitled, "Dual Energy Power Supply,", which is assigned to the same assignee as the present application and which is incorporated herein in its entirety by reference. Dual energy X-ray techniques for energy-selective reconstruction of X-ray CT images are particularly useful in indicating a material's atomic number in addition to indicating the material's density, although it is not intended that the present invention be limited to this type of control system. It should be apparent that other X-ray tube control systems can be utilized such as a single energy system. System 120 also includes shields 138, which may be fabricated from lead, for example, for preventing radiation from propagating beyond gantry support 125.

In one embodiment, the X-ray tube 128 generates a cone beam 132 of X-rays that pass through a three-dimensional imaging field, through which baggage 112 is transported by conveying system 110. After passing through the baggage disposed in the imaging field, cone beam 132 is received by detector array 130 which in turn generates signals representative of the densities of exposed portions of baggage 112. The beam therefore defines a scanning volume of space. Platform 124 rotates about its rotation axis 127, thereby rotating X-ray source 128 and detector array 130 in circular trajectories about baggage 112 as the baggage is continuously transported through central aperture 126 by conveyor system 110 so as to generate a plurality of projections at a corresponding plurality of projection angles.

In a well known manner, signals from the detector array 130 can be initially acquired by data acquisition system 134, and subsequently processed by a computerized processing system using CT scanning signal processing techniques.

As stated above, detector array 130 can be a two-dimensional array of detectors capable of providing scan data in both the directions of the X- and Y- axes, as well as in the Z-axis direction. During each measuring interval, the plurality of detector rows of the array 130 generate data from a corresponding plurality of projections and thereby simultaneously scan a volumetric region of baggage 112. The dimension and number of the detector rows are preferably selected as a function of the desired resolution and throughput of the scanner, which in turn are a function of the rotation rate of rotating platform 124 and the speed of conveying system 110. These parameters are preferably selected so that in the time required for a single complete rotation of platform 124, conveying system 110 advances the baggage 112 just enough so that the volumetric region scanned by detector array 130 during one revolution of the platform is preferably contiguous and non-overlapping with (or partially overlapping with) the volumetric region scanned by detector array 130 during the next revolution of the platform.

Conveying system 110 continuously transports a baggage item 112 through CT scanning system 120, preferably at constant speed, while platform 124 continuously rotates at a constant rotational rate around the baggage items as they pass through. In this manner, system 120 performs a helical volumetric CT scan of the entire baggage item. Baggage scanning assembly 100 preferably uses at least some of the data provided by the array 130 and a helical reconstruction algorithm to generate a volumetric CT representation of the entire baggage item as it passes through the system. In one embodiment, the system 100 performs a nutating slice reconstruction (NSR) on the data as described in U.S. Pat. No. 5,802,134, issued in the names of Gregory L. Larson, Christopher C. Ruth and Carl R. Crawford on Sep. 1, 1998, entitled, "Nutating Slice CT Image Reconstruction Apparatus and Method,". The system 100 thus provides reconstructed data of a complete CT scan of each bag, rather than only providing CT scanning of selected portions of baggage items. The baggage scanning system 100 also provides rapid scanning since two-dimensional detector array 130 allows the system 100 to simultaneously scan a relatively large portion of each baggage item with each revolution of the platform 124.

Figure 4:
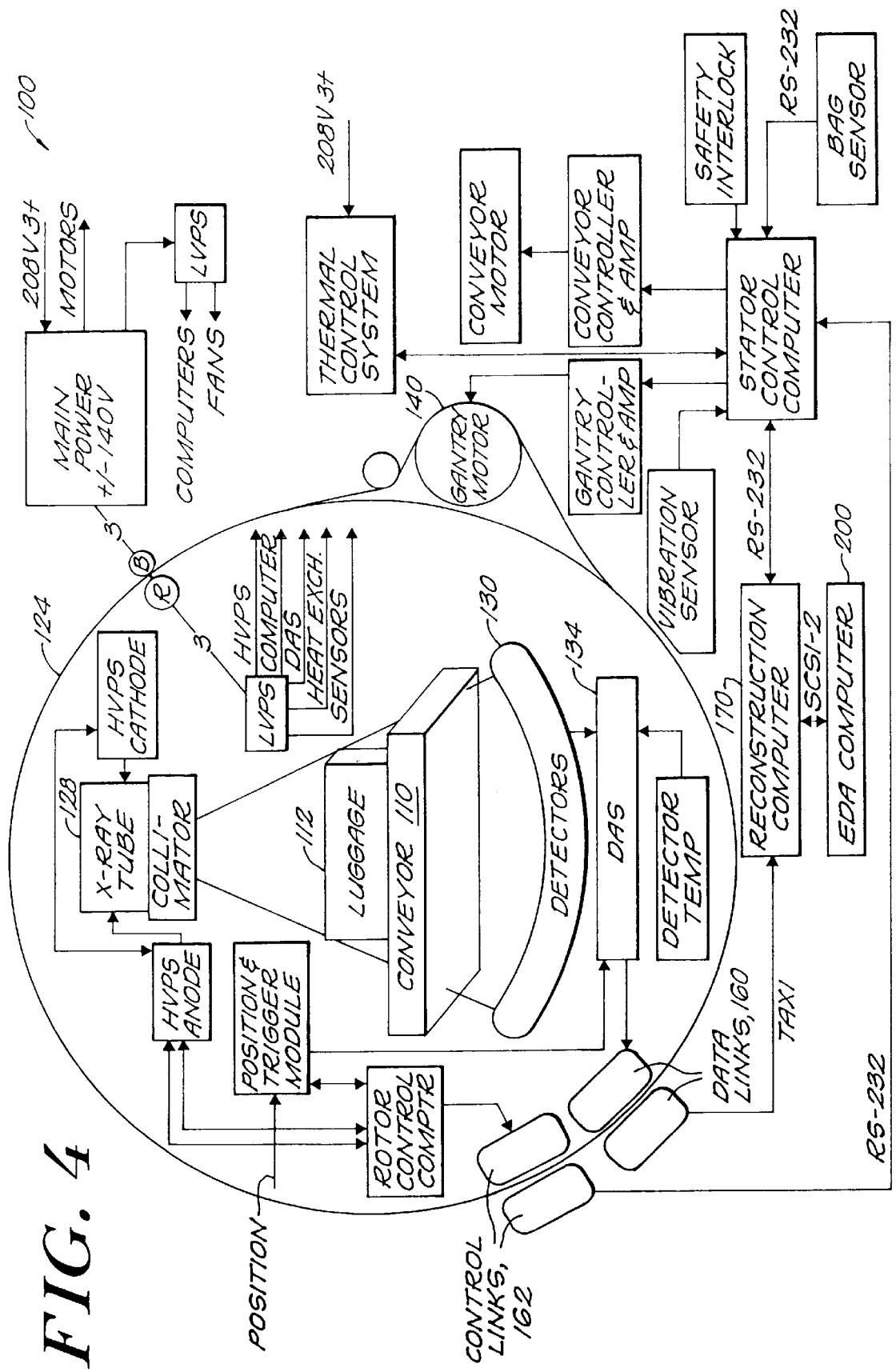
FIG. 4 is a block diagram of the embodiment of the baggage scanning system.

FIG. 4 contains a mechanical/electrical block diagram of one embodiment of the baggage scanning system 100 of the invention. The disk 124 preferably carries the X-ray tube 128, the detector array 130, the data acquisition system (DAS) 134, a high-voltage power supply and portions of the monitor/control assembly, the power supply assembly and the data link assembly. The gantry support or frame supports the entire system 100, including the baggage handling conveyor system 110. The disk 124 can be rotated at a constant rate by a belt which can be driven by a DC servomotor 140.

In one embodiment, the baggage conveyor system 110 includes a single belt driven at a continuous, constant rate to meet the specified throughput requirements. The belt can be driven by a high-torque, low-speed conveyor motor assembly, indicated at 152 to provide a constant speed under changing load conditions. A low-attenuation carbon graphite epoxy material can be used for the portion of the conveyor bed in the X-ray path. The total length of the conveyor is designed to accommodate three average length bags, although this can clearly vary. A shielded tunnel is preferably used around the conveyor to meet the appropriate safety requirements of a cabinet X-ray system.

Input power can be supplied by the facility where the system is installed. Power is transferred from the frame in any manner, such as through a series of frame brushes which make continuous contact with metal rings mounted to the disk 124. The low-voltage power supply 150 on the disk 124 provides power for the DAS 134, as well as other components mounted on the disk. A low-voltage power supply on the frame provides power for the reconstruction computer and the various monitor/control electronics. The conveyor motor assembly 152 and the gantry motor 140 can all be supplied power directly from the main supply.

The high-voltage power supply provides power to the X-ray tube 128. The supply can provide a dual voltage across the cathode/anode where dual energy control is provided. The driving waveform can be any desirable shape, and preferably is in the form of a sine wave. This supply can also provide X-ray filament power. The supply current can be held approximately constant for both voltages.

The dual-energy X-rays strike the baggage, X-rays pass through a bag and striking the detector array 130. The detectors of the detector array 130 each provide an output signal representative of the number of X-ray photons received by the detector or projection and is a function of the photons absorbed along the path of each x-ray path (defined between the source and the individual detector). The DAS 134 can sample the detector outputs and convert the outputs to digital signals to the computerized processing system (reconstruction computer) 170, which generates reconstructed CT baggage data in connection with each piece of baggage 112. In one embodiment, the digital data from the DAS 134 are transferred to the processing system 170 via a non-contact serial data link 160.

The non-contact link 160 can transfer the high-speed digital DAS data to the processing system 170 and the non-contact link low-speed monitor/control signals back and forth between the disk and frame control computers. The data link 160 can be based upon an RF transmitter and receiver.

In one embodiment, the image reconstructor portion of the processing system 170 converts the digital data from the DAS 134 into a set of two-dimensional images of bag slices for both the high and low energies. The CT reconstruction can be performed via a helical-cone-beam solution, such as the nutating slice reconstruction method described in U.S. Pat. No. 5,802,134. The reconstructor can include embedded software, a high-speed DAS port, an array processor, a DSP-based convolver, an ASIC-based backprojector, image memory, UART control port, and a SCSI output port for image data, although other architectures may be used. The array processor can perform data corrections and interpolation. The reconstructor can be self-hosted and can tag images based upon the baggage information received over the UART interface to the frame computer.

The processing system 170 can include a PC-based embedded control system. All subsystems can be monitored for key health and status information. This system can also control both motion systems, can sense baggage information, can control the environment, e.g., temperature, humidity, etc., can sense angular position of the disk 124 and can trigger the DAS and HVPS. This system can also have a video and keyboard interface for engineering diagnostics and control. Additionally, a control panel can be included for field service.

Thus, the CT scanning system 120 scans items (i.e., bags) as a series of projections, which can be combined in sets referred to as "slices" to produce slice data all acquired from the scanner as the bags move though the scanner, e.g., helically scanning the bags.

In one system incorporating the present invention, the bags were scanned at a rate of about one bag every five seconds, wherein up to about 448 CT slices were produced for each bag and slice data was transmitted by the CT scanning system 120 to the computer system 520 about every 22 milliseconds. A typical bag was thus represented with about 12M bytes of data. In the preferred embodiment, CT scanning system 120 is an AN6000 X-ray scanner, designed and manufactured by Analogic Inc. of Peabody, Mass., the assignee of the present application, although it will be appreciated that other suitable scanners may be known or become available.

As shown in FIG. 4, the image data which includes the reconstructed data is transmitted to the Explosive Detection Analysis (EDA) computer system 200. The EDA computer system 200 is preferably a commercially available multiprocessor computer system, such as the Sun Enterprise E450 using the Solaris operating system, available from Sun Microsystems, Inc., although other suitable systems may be known or become available. In processing the image data with the system 200, it is assumed that most types of explosive objects can be grouped into a number of categories which can be based upon their shapes and/or constituent materials. For example, categories can include sheets, sticks, bulks and other categories based on shapes. Certain types of materials can be subdivided into subtypes which can also be based on containers such as cylinders. These categories have different typical features, such as shape, size, mass or density. As described in the above-identified prior applications different software processes can be provided to analyze the data with regard to each of the various categories.

Figure 5:
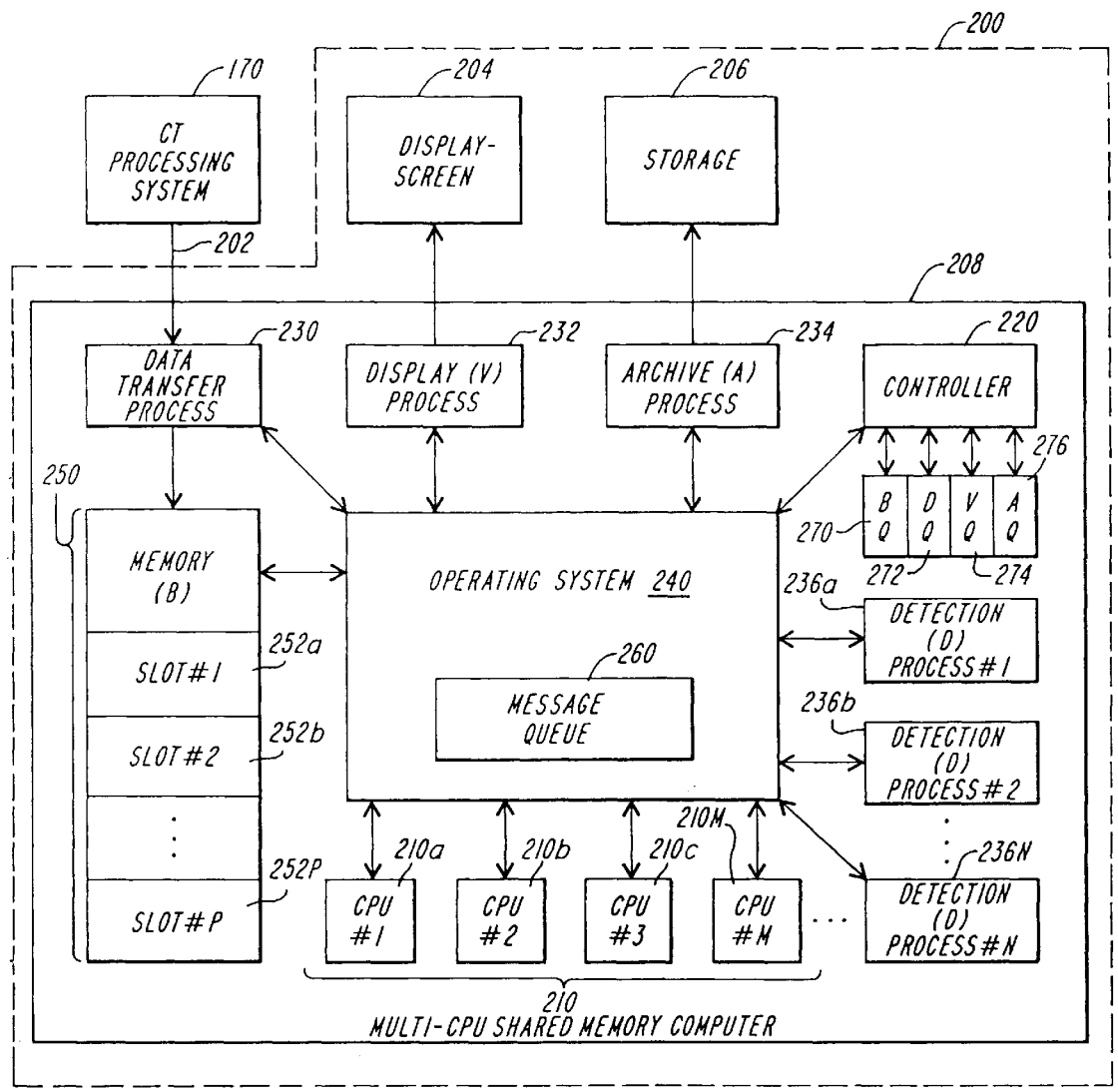
FIG. 5 is a block diagram of a scanning system incorporating a bulk shared memory for storing scanned data and detection data derived from the scanned data, all in accordance with the present invention.

FIG. 5 shows the preferred system architecture of the EDA computer system 200 as it is utilized with the software architecture, all in accordance with the present invention. The EDA computer system 200 receives the image data over the transmission link 202. The embodiment of system 200 shown in FIG. 5 includes an operator display subsystem 204, a data storage subsystem 206, and detection and process control subsystem 208.

The operator display subsystem 204 includes a video monitor for displaying images and information to the operator, and forms a part of the BVS. It displays both information relating to the image data received from the CT scanning system 120, as well as data relating to the detection and characterization of suspected threat objects in a particular bag scanned in the CT scanning system 120. The video monitor may be a standard monitor of the type which would support operator interaction with the CT scanning system 120. The data storage subsystem 206 may be any standard commercially available data storage system for storing or archiving data, and may be a volatile or nonvolatile type system, such as a magnetic tape drive, high density disk drive, or read/write CD ROM drive. The CT processing system 170, computer system 200, and operator display subsystem 204, a data storage subsystem 206, and detection and process control subsystem 208 of system 200 are all connected together using standard inter-computer data communication transmission devices and interfaces.

In the preferred embodiment, the detection and process control subsystem 208 preferably includes a plurality of processors (CPUs) 210 which can be any number of processors from 1 to M, and a main controller 220 constructed and arranged so as to respectively control and perform the various tasks of processes 230, 232, 234 and 236, carried out by the system 200 on a platform established by the operating system 240. The subsystem also includes shared bulk memory 250 for storing data as described herein. The processes include the data transfer process 230, display process 232, archive process 234, as well as the various detection processes 236 which can be any number of processes from 1 to N, wherein N is an integer. One detection process, for example, may define a path for detecting bulk explosives, while another may define a path for detecting sheet explosives as described in the above-identified applications.

The individual detection processors 210 within the detection and process control subsystem 208 can run part of one task, a complete single dedicated task, or can be shared among a plurality of tasks depending on the load on the system. Having a plurality of processors 210 (a multiprocessor system) within detection and process control subsystem 208 enhances the computer systems ability to timely process a plurality of bags at an optimum efficiency. The actual number of processors may be varied, but given that some densely populated bags may take up to 15 seconds to process, it is advantageous that detection and process control subsystem 208 include at least four processors which ensures that subsequent bags may be simultaneously processed by detection and process control subsystem 208, without causing an interruption of the CT scanning system 120. Clearly the number of processors can vary as a matter of the design objectives.

The shared bulk memory 250 is capable of storing all of the data associated with at least ten bags, although the size of the memory can vary to accommodate data associated with greater or fewer number of bags, wherein shared memory 250 is accessible by all processors 210 and processes 230, 232, 234 and 236 within computer system 200. Therefore, data are not transferred from process to process as it is operated on, rather each process accesses the data in its given shared memory location. Furthermore, the memory is preferably statically partitioned into "memory slots" 252 by controller 220, wherein each slot 252 stores all of the data associated with a single bag, although it will be evident to those skilled in the art that the partitioning can also be done dynamically. Consequently, once data associated with a scanned bag are stored in a particular memory slot, it remains there until all processing related to that data by detection and process control subsystem 208 is completed, at which time the particular memory slot 252 is then made available for new data. Those skilled in the art will appreciate that any standard processor and compatible operating system could be used to implement the present invention and that the memory could be configured in a variety of ways. The four processes 230, 232, 234 and 236 depicted in FIG. 5 represent the four primary processes carried out by the detection and process control subsystem 208.

In operation, the data transfer process 230 receives image data from CT scanning system 120, preferably in the form of reconstructed slice data for multiple slices through each bag as well as information identifying the bag, and combines all of the slice data for a scanned bag into a 3-D data representation of the bag, referred to as "bag data". The data transfer process 230 makes the bag data available for use by one of the detection processes 236 and the archive process 234. The archive process 234 preferably copies the 2-D slice data and 2-D projection data to external storage device 550 for permanent storage. One of the detection processes 236 analyzes the bag data for a given bag to determine whether explosives are present within the scanned bag, the results of this analysis being referred to as "detection results data". In this respect, depending whether more than one processor 210 is available, each available processor can be running tasks associated with any of the processes 230, 232, 234 and 236, independent of one another. The detection results data are stored in the same slot as the corresponding bag data for a particular bag. The display process 232 preferably displays 3-D bag data, and detection results data on the operator display system 204 of the BVS for operator inspection and manipulation.

Each process 230, 232, 234 and 236 described herein includes a software entity which embodies the given functionality for that process, wherein the process takes advantages of standard operating system 240 services and the detection and process control subsystem 208 hardware to accomplish its required functions. Controller 220 is comprised of a variety of services which correspond to the four primary functions of detection and process control subsystem 208, and provide for the overall management of computer resources and interaction with processes 230, 232, 234 and 236. For the most part, these software entities are written in software code, which preferably comports with the commonly accepted principles of object oriented design (OOD).

Figure 6:
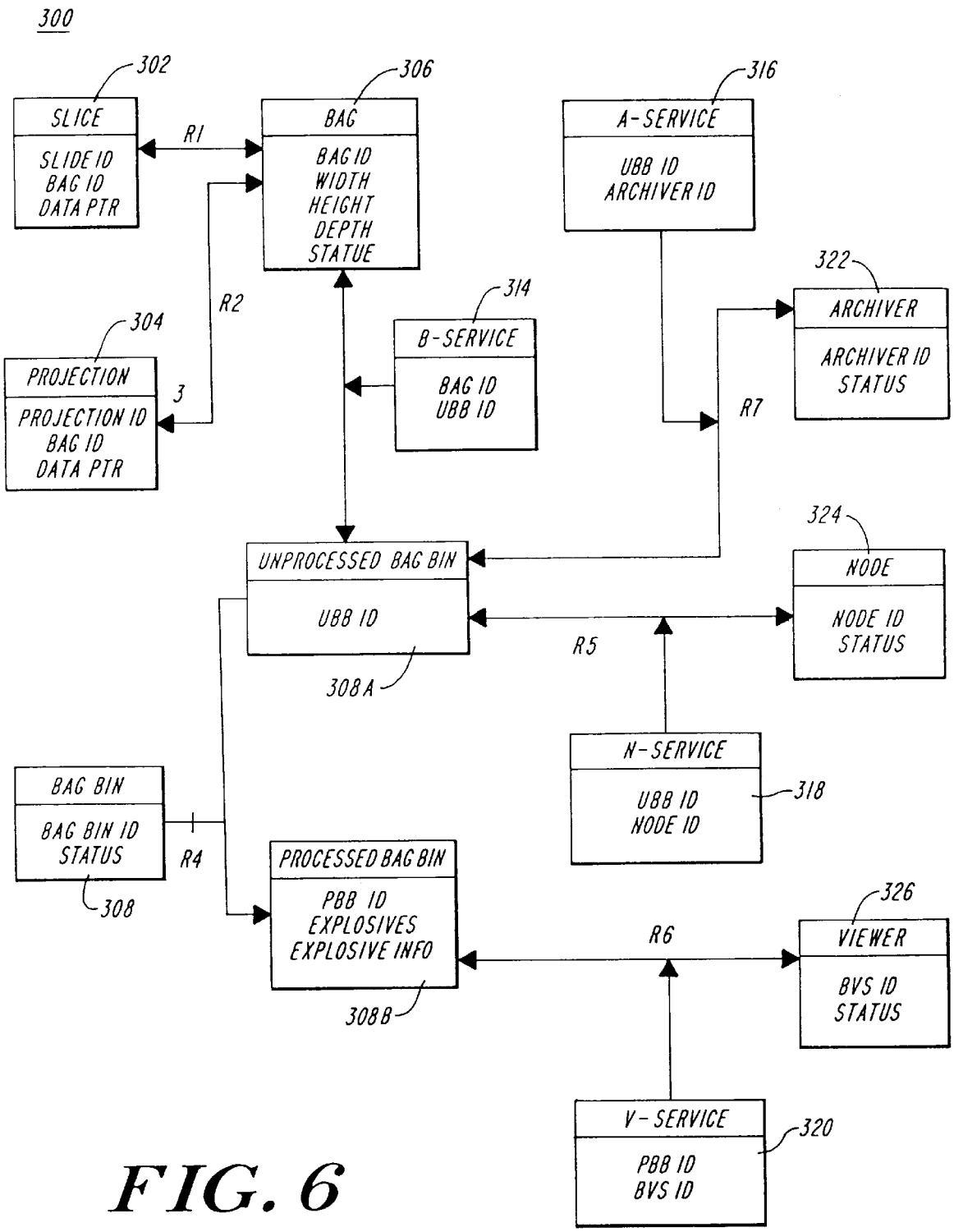
FIG. 6 is a block diagram depicting software objects and their inter-relations, in accordance with the present invention.

Referring once again to FIG. 5, the software entities embodied in the data transfer process 230, display process 232, archive process 234, detection processes 236, and resource controller 220 are, for the most part, represented as software objects, as shown in FIG. 6. The objects shown in FIG. 6 depict one embodiment of a model 300 of the static relationships between the software objects of the present invention. The relationships between objects, referred to as "relations", are depicted as arrows, R1, R2, and so on. Each object includes an identification attribute, as well as other attributes related to the methods, or functions, of the objects.

Each of the software objects and the relations between objects may be summarized as follows:

Slice Object

A software object Slice 302 contains one 2-D slice of a scanned bag, as slice data, produced by CT scanning system 120 and received by data transfer process 230 (of FIG. 5). The slice data of Slice object 302 is preferably in the form of a 2-D array of two-byte numbers. The two-byte numbers represent a density at a given point within the 2-D cross section of the scanned bag. Slice object 302 also contains an identifying attribute "Slice ID", which uniquely identifies a given Slice object 302. A "Bag ID" attribute and a data pointer are also contained within Slice object 302, and associate the Slice object 302 with the scanned bag to which it belongs. In the preferred form, up to about 448 slices, or 448 Slice objects, are produced by the CT scanning system 120 for each scanned bag, although the number can clearly vary depending on design criteria. A Slice object is created when the slice data is received from the CT scanning system by the detection and process control subsystem 208.

Projection Object

Projection data is received by detection and process control subsystem 208 from CT scanning system 120 and held in a software Projection object 304. There are three planar projections taken by the CT scanning system for each bag scanned, a top, side, and oblique projection. Consequently, there are three Projection objects created for each bag scanned. The projection data of Projection object 304 is in the form of a 2-D array of numbers, which represent a density at a given point in the planar projection view. Each projection object 304 contains an identification attribute "Projection ID", which uniquely identifies the Projection object. Additionally, like Slice object 302, each Projection object 304 also contains an attribute which is a data pointer to the scanned bag with which it corresponds. The Projection object 304 is created when the projection data is received by the detection computer 200.

Bag Object

All of the slice data, held within Slice objects, which were created from a single scanned bag are preferably combined to form a 3-D representation of the scanned bag, referred to as bag data. The bag data is held within a software Bag object 306. This relationship between Slice objects 302 and their corresponding Bag object 306 is represented by relation arrow R1. Also held in Bag object 306 is the corresponding projection data, held in Projection objects 304, for the scanned bag. This relationship between each of three Projection objects 304 and their corresponding Bag object 306 is represented by relation arrow R2. An identification attribute referred to as "Bag ID" exists within and uniquely identifies a given Bag object 306. Other attributes within Bag object 306 relate to the 3-D size of the scanned bag and include "width", "height", and "depth" of the bag. A status attribute within bag object 306 provides an indication of whether the Bag object 306 is available for processing, being processed, or completed processing by one of the detection processes 236. The Bag object 306 is created once all of the slice data and projection data are transferred from the CT scanning system 120 to detection computer 210 for a given bag.

Bag Bin Object

Each Bag object 306 is notionally stored in a software Bag Bin object 308, which is created from an abstract Bag Bin class. The general utility of a Bag Bin object 308 is to provide a way of categorizing Bag objects 306 stored in memory as being either processed or unprocessed. To that end, a status attribute is included within a Bag Bin object 308 which reflects the state of processing of the Bag object 306 and a "Bag Bin ID" attribute is included which uniquely identifies each Bag Bin object. A processed bag object is one in which its bag data has been analyzed by a detection node object 324 and an unprocessed bag object is one in which its bag data has not been completely analyzed. In the preferred embodiment, this categorization is accomplished by defining an Unprocessed Bag Bin sub-class and Processed Bag Bin sub-class of the abstract class Bag Bin. Since Unprocessed Bag Bin and Processed Bag Bin are sub-classes of Bag Bin, Unprocessed Bag Bin objects 308a and Processed Bag Bin objects 308b inherit the attributes of the Bag Bin class. The sub-class relationships between Bag Bin 308 and Unprocessed Bag Bin 308a and Processed Bag Bin 308b are depicted by relation arrow R4, in FIG. 6.

Unprocessed Bag Bin Object

The software object Unprocessed Bag Bin 308a holds a Bag object 306 that is available to be processed by a detection Node object 324. The relationship between a Bag object 306 and its corresponding Unprocessed Bag Bin object 308a, is depicted by arrow R3. Beyond the attributes an Unprocessed Bag Bin object 308a inherits from a Bag Bin object 308, it also includes an "UBB ID", which uniquely identifies a given Unprocessed Bag Bin object 308a.

Processed Bag Bin Object

Once a Bag object 306 within Unprocessed Bag Bin 308a has been completely processed by a detection Node object 324 the Bag object 306 is notionally transferred from a Unprocessed Bag Bin 308a object to a Processed Bag Bin 308b object. This "transfer" is actually a re-catagorization of the Bag object as being processed, so the bag data is not actually moved within detection computer 200. Processing by the detection Node object produces detection results, which are stored with the bag data. Once in the Processed Bag Bin 308b, the bag data and detection results are available to be sent to a Viewer object 326. Beyond the attributes inherited from Bag Bin 308, the Processed Bag Bin object 308b includes an attribute named "PBB ID", which uniquely identifies the processed bag bin object. Additionally, attributes incorporating the detection results data are included in the Processed Bag Bin object 308b. The "#explosives" attribute contains a number indicating the quantity of detected explosives in the Bag object 306. For each detected explosive, an attribute entitled "explosive info" contains information relating to characteristics of the detected item.

Archiver Object

The software object Archiver 322 represents the Archive Process 234 (of FIG. 5) of detection computer 200. The responsibility of Archiver object 322 is to perform methods which archive the bag data, from Bag object 306, to an external storage device 206. This object sends messages to A-Service Assigner 316 indicating its status as either available or unavailable to receive bag data, from a Bag object 306 in the Unprocessed Bag Bin 308a, as indicated by relation arrow R7. Accordingly, this object includes an "Archiver ID" attribute and a "status" attribute. The status attribute reflects the availability of the archival system. While detection computer 200 shows a single archiver process 234, a number of Archive processes may be included within the detection computer 200.

Node Object

The software object Node 324 represents any of the detection processes 236 (of FIG. 5) of the detection computer 200. The Node object 324 hosts the explosive detection algorithm of the detection computer 200. This algorithm is described in the above-identified U.S. patent applications. The responsibility of Node object 324 is to communicate with the software object N-Service Assigner 318 to indicate that the explosive detection software of Node object 324 is available to accept bag data, wherein received bag data is transferred to the explosive detection algorithm upon receipt and processed to produce detection results data. Once detection analysis is complete, the Node object 324 transfers the detection results data to the Bag Bin 308, where it is stored in the Processed Bag Bin 308b. The relationship between the Bag Bin object 308 and a Node object 324 is depicted by relation arrow R5. In the preferred form, a number (at least equal to the number of processors 210 in detection computer 200) of the Node instances will exist at the same time.

Viewer Object

The software object Viewer 326 represents the display process 232 of detection computer 200. The Viewer object 326 encompasses methods that provide the operator interface for the CT baggage scanning system 100. Viewer object 326 enables the operator display subsystem 204 to display threat bags (i.e., bags having explosives detected therein) and corresponding explosive item information on the screen, and accept commands from the operator for control of the various subsystems within the CT baggage scanning system 100. The relationship between a Processed Bag Bin 308b and a Viewer object 320 is depicted by relation arrow R6.

Bag Bin Service Assigner Object

A software object B-Service Assigner 314 does not hold data which relates to a scanned bag per se, but rather assigns which Bag object 306 should take which Unprocessed Bag Bin 308a. Accordingly, B-Service Assigner 314 need only include the attributes Bag ID and UBB ID. The relation R3 between a Bag object 306 and an Unprocessed Bag Bin object 308a is considered a "competitive relation" because Bag object 304 can not be assigned to an Unprocessed Bag Bin without the direction of B-Service Assigner 314.

Archive Service Assigner Object

A software object A-Service Assigner 322 assigns an Unprocessed Bag Bin object 308a, which corresponds to a Bag object 306, to an Archiver object 322. The A-Service Assigner object 322 does not hold data which relates to a scanned bag per se, but rather assigns which Unprocessed Bag Bin should be serviced by a given Archiver 322. Accordingly, A-Service Assigner need only include the attributes Archiver ID and UBB ID. The relation R7 between an Archiver object 322 and an Unprocessed Bag Bin object 308a is considered a competitive relation, since Archiver object 322 cannot access data in an Unprocessed Bag Bin without the direction of A-Service Assigner 322.

Node Service Assigner Object

The software object N-Service Assigner 318 assigns Unprocessed Bag Bin object 308a, which corresponds to a Bag object 306, to an available Node object 324. The N-Service Assigner object 318 does not hold bag data itself, but rather assigns bag data in the Unprocessed Bag Bin 308a to an available detection Node object 324. Therefore, N-Service Assigner 318 need only contain the attributes UBB ID and Node ID. The relation R5 is competitive, since a Node object 324 can not access data in an Unprocessed Bag Bin object 308a without the direction of N-Service Assigner 318. N-Service Assigner 318 maintains a queue related to a Bag object associated with an Unprocessed Bag Bin object waiting to be processed and a queue of available Node objects to process the Bag objects. It assigns the first Bag object from the bag queue 270 to the first Node object from the node queue 272.

Viewer Service Assigner Object

The software object V-Service Assigner 320 assigns a Processed Bag Bin object 308b, which corresponds to a processed Bag object 306, to an available Viewer object 326. Accordingly, the V-Service Assigner 320 does not contain bag data or detection results, but rather includes the PBB ID and (Bag Viewing System) BVS ID attributes. The relation R6 between an Viewer object 326 and a Processed Bag Bin object 308b is considered a competitive relation, since Viewer object 326 can not access data in a Processed Bag Bin without the direction of V-Service Assigner 320. V-Service Assigner 320 keeps a queue related to Bag objects associated with a Processed Bag Bin object to be displayed on the operator display subsystem 130 and a queue for the available Viewer objects 326. It assigns the first Bag object from the bag queue 270 to the first viewer object in the Viewer queue 274.

Architecture Implementation

Figure 7:
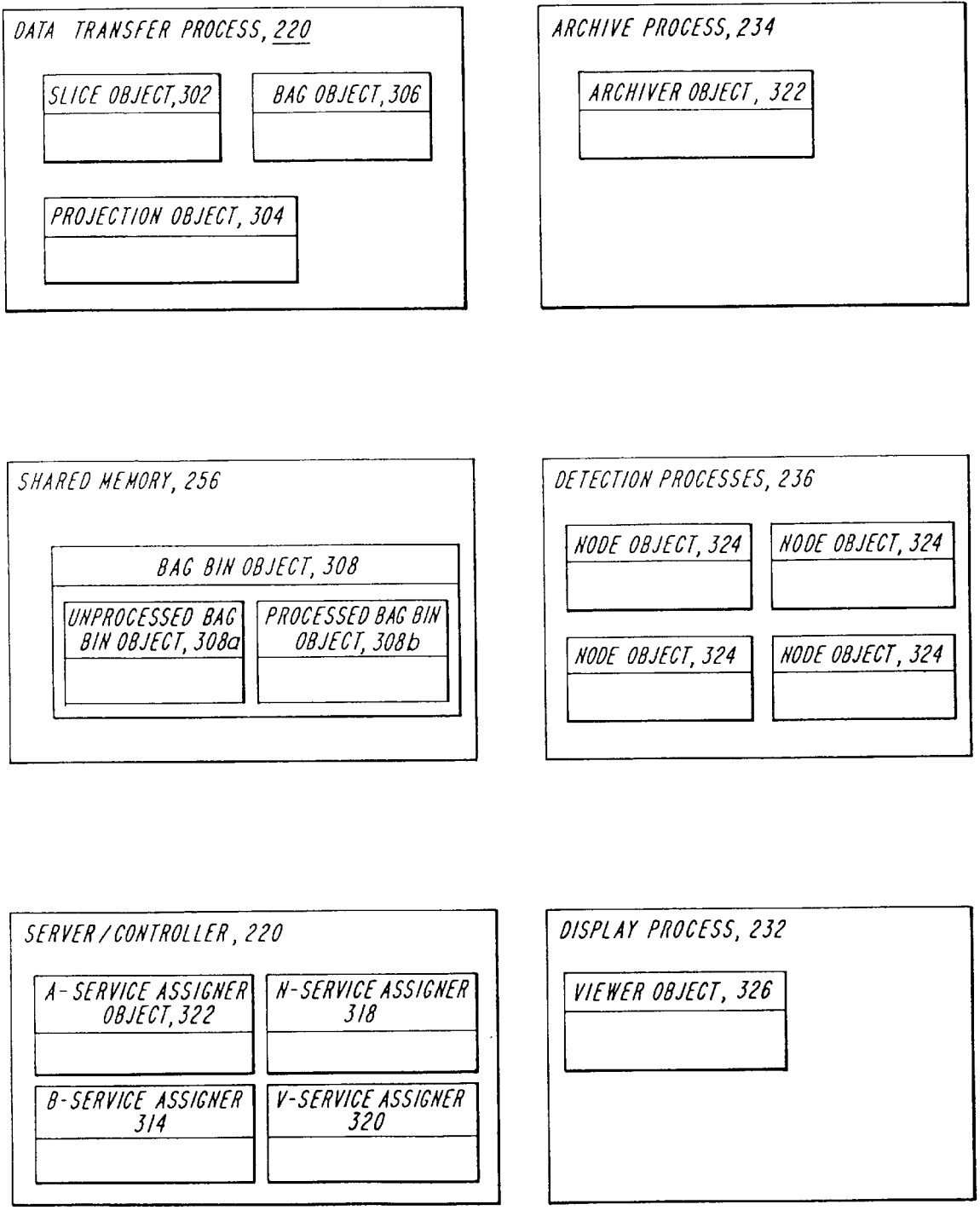
FIG. 7 depicts the mapping of software objects of FIG. 5 to the architecture implementation of the present invention.

The objects discussed above are mapped to the detection computer 200 resources (e.g., processes 230, 232, 234 and 236 and memory 250) of FIG. 5 to form the implementation of the preferred embodiment of the present invention. In one preferred embodiment, the architecture includes a server process which is comprised of service assigners, and includes client processes, which correspond to the four primary functions of the detection computer. The server controls all of shared resources, the data traffic between clients, and dispatches processing jobs to client processes. In the preferred embodiment, the dispatching of processing jobs is accomplished by the server creating and managing queues relating to data and available processes and controlling the assignment of processes to data. As shown in FIG. 7, the service assigner objects A-Service Assigner 316, B-Service Assigner 314, N-Service Assigner 318, and V-Service Assigner 320 are mapped to controller (i.e. server) 220 (of FIG. 5) of detection computer 200 and provide these basic assignment functions. The Slice, Projection, and Bag objects are mapped to the client data transfer process 230. The bag bin objects 308, 308a, and 308b are mapped to memory 250. Archiver object 322 is mapped to archive process 234 (of FIG. 5). Each Node object 324 is mapped to a client detection process 236. And, Viewer object 326 is mapped to client display process 232. The interaction between the server and client processes for the four primary functions of detection computer 200 is described in more detail below.

Data Transfer Process

Referring to FIGS. 5–7, the functionality of the B-Service Assigner object 314 is mapped to controller 220 and corresponds to the part of controller (server) 220 that is associated with assigning a suitable shared memory slot for storage of bag data by the data transfer process 230. When the data transfer process 230 receives slice data and planar projection data from the CT scanner 170, it combines the slice data and projection data to create 3-D bag data. The slice data is mapped from the Slice object 302, the projection data is mapped from the Projection object 304, and the bag data is mapped from the Bag object 306. Referring to FIG. 5, the data transfer process sends a message to the controller 220 via the message queue 260, requesting for a memory slot 252 to store the bag data. A functional portion of the server 230 which corresponds to the mapped B-Service Assigner 314 gets the request from the data transfer process and passes the address of the memory slot 252 within the shared memory 250 to the data transfer process 230 via the message queue 260. The data transfer process 230, then, stores the bag data into the memory slot 252 given by the controller 220. Each memory slot includes two segments. The first segment holds the bag data, and is mapped from the Unprocessed Bag Bin object 308a. The second segment holds the detection results data, and along with the bag data is mapped from the Processed Bag Bin object 308b.

Archive Process

The functionality of the A-Service Assigner object 314 is mapped to a part of the server (controller) 220 which is associated with assigning a shared memory slot 252 to an archiver process 234 that stores the data contained in the given shared memory slot 252 onto an external data storage device 206. Accordingly, the Archiver object 322 is mapped to the client archive process 234 and embodies the substantive functionality thereof. Once bag data are stored in a memory slot 252, the data can be archived by an available archive process 234. In the preferred embodiment, the controller 220 attempts to match the memory slot 252 that contains the recently loaded data with an available archiver process 234. The controller 220 checks the archiver queue 276 to see if there is any archiver in the queue to archive the bag data. If found, the controller 220 sends the address of the shared memory slot 252 that contains the bag data to the available archiver, updates the status of the bag data in the bag queue 270, and removes the archiver from the archiver queue 276. When the archive process 234 is available, it informs the controller 220 for its availability via the message queue 260, and waits for a message from the controller 220. The controller 220, upon receiving the message, puts the archiver into the archiver queue 276, and updates the bag status in the bag queue 270. The first archiver in the archiver queue is used for the next incoming data. In another preferred embodiment, which does not include a controller 220, when an archiver is available to archive a bag data, it continually checks the shared memory for a recently loaded bag data that needs to be archived.

Detection Process

The functionality of the N-Service Assigner object 318 is mapped to a part of the controller 220 which is associated with assigning the memory slot 252 containing the bag data to be processed to one of the detection processes 236. Accordingly, the Node object 324 is mapped to a corresponding detection process 236, wherein multiple Node objects, for example 1-N, may exist and would correspond to multiple detection processes 1-N. Once a bag data is stored in a memory slot 252, it can be processed by an available detection process.

In the preferred embodiment, the server (controller) 220 attempts to match the memory slot 252 that contains the recently loaded data with an available detection process. The server 220 checks the node queue 272 to see if there is any detection process in the queue 272 to process the bag data. If found, the controller 220 sends the address of the shared memory slot that contains the bag data to the available detection process, updates the status of the bag data in the bag queue 270, and removes the detection process from the node queue 272. When a detection process 236 is available, it informs the controller of its availability via the message queue 260, and waits for a message from the controller 220. The controller 220, upon receiving the message, puts the detection process into the node queue 272, updates the bag status in the bag queue 270. The first detection process in the node queue is used for the next incoming data.

In another embodiment, which does not include a server (controller), when a detection process is available to process a bag data, it continually checks the shared memory for recently loaded bag data that needs to be processed. Detection process 236 analyzes the bag data and puts the detection result data into the second segment of the memory slot which holds the bag data.

Display Process

The functionality of the V-Service Assigner object 320 is mapped to a part of the controller 220 which is associated with assigning the memory slot 252 containing the bag data to be viewed to one of the display processes 232. Accordingly, the Viewer object 326 is mapped to the display process 232 and embodies the substantive functionality thereof. Once a detection results of a bag data is stored in the results segment of the shared memory slot 252, it can be viewed on a display station by the operator.

In the preferred embodiment, the controller 220 attempts to match the memory slot 252 that contains the recently processed data with an available display process. The server 220 checks the viewer queue 274 to see if there is any display process in the queue to display the bag data and its detection results. If found, the server 220 sends the address of the shared memory slot that contains the bag data and its detection results to the available display process, updates the status of the bag data in the bag queue 270, and removes the display process from the viewer queue 274. When a display process 232 is available (i.e., when the operator is done viewing the bag data), it informs the server for its availability via the message queue 260, and waits for a message from the controller 220. The controller 220, upon receiving the message, puts the display process into the viewer queue 274, updates the bag status in the bag queue 270, and if the bag data status is "all done" makes the memory slot that holds the bag data available for data transfer process to load a new bag data. The first display process in the viewer queue is used for the next bag data to be displayed.

The architecture described herein allows the baggage scanning system 100 to operate at data rates at least an order of magnitude, or greater, than the Invision Machine.

The invention may be embodied in other specific forms without departing from the spirit or central characteristics thereof. For example, while the detection processes have been described as controlled by a controller, the detection processes can alternatively coordinate themselves, while in another embodiment the detection processes are controlled by a controller. In addition while to the shared bulk memory has been described as controlled by the controller, access to the shared bulk memory can be controlled by an access flag.

In addition, in another embodiment of a type which does not include a controller, when a display process is available to display bag data and its detection results, it can continually check the shared memory for a processed bag that needs to be displayed.

In one alternative embodiment the displayed information related to at least one of the CT slices and associated detection data includes displayed CT data in the order that the detection processes are completed with respect to each scanned item. In another embodiment, the displayed information related to at least one of said CT slices and associated detection data includes displayed CT data in the order each bag enters the scanner system. In still another embodiment the displayed information relating to at least one of the CT slices and associated detection data includes marking suspected objects in images of CT slices. While in another embodiment the displayed information relates to at least one of the CT slices and associated detection data and includes marking suspected objects in synthetic projections of the items. Yet in another embodiment the displayed information relating to at least one of the CT slices and associated detection data includes additional information associated suspected objects detected, such as the nature of the suspected objects, and in another embodiment, the displayed information related to at least one of said CT slices and associated detection data can include markings around suspected objects in the display information and linking the displayed information related to a suspected object and the marks. In yet another embodiment, the information displayed automatically changes as the items move through the scanner, with an additional feature being provided to suspend the display of information related to at least one of said CT slices and associated detection data to examine the display. In yet another embodiment the operator can clear a false detection of a suspected object through the BVS. In another embodiment, information can be displayed regarding any items that have been scanned by the scanner and are waiting to be displayed, which in one specific embodiment is the number of such items. In still another embodiment item identification numbers associated with such items can be processed and displayed. In another embodiment information regarding any items that are awaiting detection by the scanner is displayed, which in one specific embodiment is the number of such items, and in another specific embodiment the displayed information includes item identification numbers associated with such items. Further, an embodiment can include one or more of these additional features.

In addition, while the preferred embodiment was described with respect to detection of explosives, the present invention could also be practiced in systems which detect other types of contraband (e.g. drugs, weapons or money), which is primarily the function of the detection algorithm. Further, while the preferred embodiment is described as a baggage scanning system, the system can be used to detect any object with a unique X-ray signature concealed in any item. For example, the scanning system can be used in scanning containers such as boxes, envelopes and other packaging for detecting contraband. Furthermore, it will be appreciated by those skilled in the art that the detection computer could be interfaced with a plurality of each type of external device (e.g., operator display subsystem) or combinations thereof, as well as with different devices which could make use of the data or other resources embodied within the detection computer. The present embodiment is therefore to be considered in all respects as illustrative and not restrictive, the scope of the invention being indicated by appending claims rather than by the foregoing description, and all changes that come within the meaning and range of equivalency of the claims are therefore intended to be embraced therein. Finally, which the CT scanner described is of the third generation type, it should be appreciated that the CT scanner may take other forms and configurations, such as a CT scanner of the fourth generation type.

What is claimed is:

1. A system for automatically detecting predetermined image information contained with data representative of a scanned image of an object, a system architecture comprising:
   one or more data processes to fill shared memory with the data;
   one or more detection processes to detect the presence of the predetermined image information from the data in shared memory;
   one or more display processes to display information related to (a) the data and (b) the presence of the predetermined image information from the data in shared memory; and
   a controller process constructed and arranged so as to support the data, detection and display processes substantially independently of one another all on the same computer system having predetermined resources so that the resources are used in an optimal timely fashion.

2. A system according to claim 1, further including a conveyor constructed and arranged to sequentially scan a plurality of objects.

3. A system according to claim 1, wherein the detection processes provide detection and classification data relating to the presence or absence of the predetermined image information.

4. A system according to claim 3, wherein the detection processes are arranged so as to coordinate themselves.

5. A system according to claim 3, wherein the detection processes are controlled by a controller.

6. A system according to claim 5, further including a controller, and wherein access to the shared bulk memory is controlled by the controller.

7. A system according to claim 1, further including an access flag arranged so as control access to the shared bulk memory.

8. A system according to claim 1, further including an archive system constructed and arrange to store the imaging data.

9. A system according to claim 1, further including a non-volative memory of an archive system constructed and arranged to store the imaging data.

10. A system according to claim 1, further including a scanner constructed and arranged so as to scan the object so as to acquire the data.

11. A system according to claim 10, wherein the scanner is a CT scanner, and further including a display constructed and arranged so as to display information related to at least one CT slice and associated detection data.

12. A system according to claim 11, wherein the system is constructed and arranged to display the CT data in the order that the detection processes are completed with respect to each scanned item.

13. A system according to claim 11, wherein the system is constructed and arranged to display the CT data in the order each item enters the scanner.

14. A system according to claim 11, wherein the system is constructed and arranged to display markings of suspected objects in images of CT slices.

15. A system according to claim 11, wherein the system is constructed and arranged to display markings of suspected objects in synthetic projections of the items.

16. A system according to claim 11, wherein the system is constructed and arranged to display additional information associated suspected objects detected.

17. A system according to claim 16, wherein the system is constructed and arranged to display markings of suspected objects in the display information and linking information related to a suspected object and the markings.

18. A system according to claim 11, wherein the system is constructed and arranged so that the information displayed automatically changes as the items move through the scanner, and is capable of suspending the display of information related to at least one of said CT slices and associated detection data to examine the display.

19. A system according to claim 11, wherein the system is constructed and arranged so that a false detection of a suspected object can be cleared by the operator.

20. A system according to claim 11, wherein the information displayed includes information regarding any items that have been scanned by the scanner and data that are waiting to be displayed.

21. A system according to claim 20, wherein the information displayed includes the number of such items.

22. A system according to claim 20, wherein the information regarding any items that have been scanned includes item identification numbers associated with such items.

23. A system according to claim 11, wherein information displayed includes information regarding any items that are awaiting detection by the scanner.

24. A system according to claim 23, wherein information regarding any items that are awaiting detection includes displaying the number of such items.

25. A system according to claim 23, wherein the information regarding any items that are awaiting detection includes item identification numbers associated with such items.

26. A scanning apparatus capable of detecting and classifying objects contained within or concealed by items scanned by the apparatus, the scanning apparatus comprising:

A. at least one CT x-ray scanner constructed and arranged so as to generate CT data representative of a plurality of CT slices of a scanned item;

B. a communication subsystem in communication with the scanner;

C. a detection and classification subsystem constructed and arranged so as to process CT data and provide detection and classification data related to the absence or the suspected presence of detected objects associated with one or more CT slices of a scanned item;

D. a bulk shared memory comprising a plurality of memory slots constructed to store CT data and detection and classification data related to the detection and classification of suspected objects derived from the CT data; and E. a control subsystem cooperative with (1) the communication system so as to enter CT data received from the scanner into slots of the bulk shared memory; (2) the detection and classification subsystem so as process CT data so as to provide detection and classification data, and store the detection and classification data in slots of the bulk shared memory.

27. A scanning apparatus according to claim 26, further including a conveying system for conveying items through the scanner.

28. A scanning apparatus according to claim 26, wherein said detection and classification subsystem includes multiple processors each cooperative with the bulk shared memory.

29. A scanning system according to claim 26, wherein said detection and classification subsystem is constructed and arranged so as to process CT data and provide detection and classification data related to the absence or the suspected presence of objects associated with one or more CT slices of a scanned item in accordance with each of a plurality of different sets of detection criteria and a plurality of independent processes.

30. A scanning system according to claim 29, wherein the plurality of independent processes coordinate themselves.

31. A scanning system according to claim 29, wherein said control subsystem includes a coordinator constructed to coordinate the plurality of independent processes.

32. A scanning system according to claim 31, wherein said coordinator controls access to the shared bulk memory.

33. A scanning system according to claim 26, wherein the control subsystem includes an access flag for controlling access to the shared bulk memory.

34. A scanning system according to claim 26, further including an archive subsystem constructed and arranged so as to store CT data.

35. A scanning system according to claim 33, wherein the archive system includes non-volatile memory constructed and arranged to store CT data.

36. A scanning apparatus according to claim 26, further including a display constructed and arranged so as to display information related to at least one of said CT slices and associated detection data.

37. A method of detecting predetermined objects contained within or concealed by items scanned by an X-ray scanner, comprising:

entering imaging data received from the scanner into slots of a bulk shared memory;

processing imaging data so as to provide detection and classification data relating to absence or suspected presence of predetermined objects; and storing the detection and classification data in slots of the bulk shared memory.

38. Method according to claim 37, wherein processing imaging data includes sharing bulk memory among a plurality of processors.

39. A process of detecting the presence of predetermined objects contained within or concealed by items scanned by an X-ray scanner, comprising:

receive a set of data representative of a corresponding scanned object and store the set of data in a predefined slot in memory in a predetermined data queue;

process data in each slot in a predetermined detection queue in accordance with one or more detection processes;

storing the results of each detection process in the same slot in which the corresponding set of data is stored; and displaying the results of the detection process.

* * * * *